United States Patent
Yamasaki

(10) Patent No.: US 8,829,746 B2
(45) Date of Patent: Sep. 9, 2014

(54) CONTROLLER FOR AN ELECTRIC MOTOR

(75) Inventor: Masashi Yamasaki, Obu (JP)

(73) Assignee: Denso Corporation, Kariya (JP)

( * ) Notice: Subject to any disclaimer, the term of this patent is extended or adjusted under 35 U.S.C. 154(b) by 69 days.

(21) Appl. No.: 13/312,087

(22) Filed: Dec. 6, 2011

(65) Prior Publication Data

US 2012/0161689 A1    Jun. 28, 2012

(30) Foreign Application Priority Data

Dec. 28, 2010  (JP) ................. 2010-292293

(51) Int. Cl.
| | |
|---|---|
| H02K 11/00 | (2006.01) |
| H02P 25/22 | (2006.01) |
| B62D 5/04 | (2006.01) |
| H02K 5/22 | (2006.01) |

(52) U.S. Cl.
CPC ............ *H02P 25/22* (2013.01); *H02P 2201/07* (2013.01); *B62D 5/0484* (2013.01); *H02K 11/0073* (2013.01); *H02K 5/225* (2013.01); *B62D 5/0406* (2013.01)
USPC .......... 310/68 R; 310/68 D; 310/72; 310/110; 318/400.42

(58) Field of Classification Search
USPC ........................ 310/68 D, 68 R; 318/400.42
See application file for complete search history.

(56) References Cited

U.S. PATENT DOCUMENTS

| | | | |
|---|---|---|---|
| 7,989,997 B2* | 8/2011 | Hashimoto et al. ......... 310/68 D |
| 2002/0060105 A1 | 5/2002 | Tominaga et al. | |
| 2007/0070667 A1* | 3/2007 | Stancu et al. ................. 363/132 |
| 2010/0320880 A1* | 12/2010 | Kamogi .................... 310/68 B |

FOREIGN PATENT DOCUMENTS

| | | | |
|---|---|---|---|
| JP | 2009267013 A | * | 11/2009 |
| WO | WO 2010110483 A2 | * | 9/2010 |

* cited by examiner

*Primary Examiner* — Eduardo Colon Santana
*Assistant Examiner* — Bickey Dhakal
(74) *Attorney, Agent, or Firm* — Harness, Dickey & Pierce, PLC

(57) ABSTRACT

Each of a first and a second inverter circuit supplies a driving current to an electric motor in a different power supply line. A custom IC has a first pre-driver circuit for outputting control signals to the first inverter circuit and a second pre-driver circuit for outputting control signals to the second inverter circuit. A micro-computer for outputting operation signals to the first and second pre-driver circuits is mounted to a control board on a center line. A distance between the center line and the first inverter circuit and a distance between the center line and the second inverter circuit is equal to each other. First and second output terminals of the micro-computer as well as first and second input and output terminals of the custom IC are symmetric with respect to the center line.

11 Claims, 9 Drawing Sheets

CONTROLLER FOR AN ELECTRIC MOTOR

CROSS REFERENCE TO RELATED APPLICATION

This application is based on Japanese Patent Application No. 2010-292293 filed on Dec. 28, 2010, the disclosure of which is incorporated herein by reference.

FIELD OF THE INVENTION

The present invention relates to a controller for driving and controlling an operation of an electric motor.

BACKGROUND OF THE INVENTION

In an electric driving apparatus, which is applied to an electrical power steering system of a vehicle for assisting a steering operation of a vehicle driver, it is known in the art that an electric motor and a controller for driving and controlling the electric motor are combined into one, for example, as disclosed in Japanese Patent Publication No. 2002-120739.

According to the above controller, the electric motor is operated by a single system of an inverter circuit. Therefore, in a case that the inverter circuit breaks down, a load to the vehicle driver for the steering operation is increased.

In a case that two systems of the inverter circuits are provided for driving the electric motor, it is possible to continuously drive the electric motor by one of the inverter circuits even when the other of the inverter circuits breaks down.

However, when a difference exists between a value of driving current supplied to the electric motor from one of the inverter circuits and a value of driving current supplied to the electric motor from the other of the inverter circuits, a rotational balance of the electric motor becomes worse and driver's feeling for the steering operation may be decreased.

SUMMARY OF THE INVENTION

The present invention is made in view of the above problems. It is an object of the present invention to provide a controller, according to which the rotational balance of the electric motor is increased.

According to a feature of the present invention, for example, as defined in the appended claim 1, a controller for driving and controlling rotation of an electric motor is composed of a first current-supply circuit, a second current-supply circuit, a control board, an integrated circuit, and a micro-computer.

The first current-supply circuit and the second current-supply circuit supply driving current to the electric motor. Control terminals are connected to a control board. Control signals, which control switching operations of the first and second current-supply circuits, are inputted to the control terminals. The integrated circuit, which is mounted to the control board, has a first pre-driver circuit for outputting the control signals to the first current-supply circuit and a second pre-driver circuit for outputting the control signals to the second current-supply circuit. The micro-computer, which outputs operation signals for controlling output of the control signals from the first and second pre-driver circuits, is mounted to the control board on a center line, wherein a distance between the center line and the first current-supply circuit and a distance between the center line and the second current-supply circuit is substantially equal to each other.

Output terminals of the micro-computer for outputting the operation signals to the first pre-driver circuit and output terminals of the micro-computer for outputting the operation signals to the second pre-driver circuit are arranged so as to be symmetric with respect to the center line.

The integrated circuit has first and second input terminals, which are mounted to the control board so as to be symmetric with respect to the center line, wherein the operation signals are respectively transmitted from the micro-computer to the first and second input terminals via wiring patterns formed on the control board and then inputted into the first and second pre-driver circuits.

The integrated circuit further has first and second output terminals, which are mounted to the control board so as to be symmetric with respect to the center line, wherein the control signals are respectively outputted from the first and second pre-driver circuits to the first and second current-supply circuits via wiring patterns formed on the control board.

According to the above feature of the invention, a length of the wiring patterns between the micro-computer and the first pre-driver circuit can be easily made equal to a length of the wiring patterns between the micro-computer 94 and the second pre-driver circuit. In other words, the impedance from the micro-computer to the first pre-driver circuit and the impedance from the micro-computer to the second pre-driver circuit can be easily made equivalent to each other.

In addition, a length of the wiring patterns between the first pre-driver circuit and the first current-supply circuit can be easily made equal to a length of the wiring patterns between the second pre-driver circuit and the second current-supply circuit. In other words, the impedance between the first pre-driver circuit and the first current-supply circuit and the impedance between the second pre-driver circuit and the second current-supply circuit can be easily made equivalent to each other.

As a result, the impedance from the micro-computer to the first current-supply circuit and the impedance from the micro-computer to the second current-supply circuit can be easily made equivalent to each other. Therefore, the driving current to be supplied from the first current-supply circuit to the electric motor can be easily made equal to the driving current to be supplied from the second current-supply circuit to the electric motor. The rotational balance of the electric motor can be thereby improved.

In addition, according to the present embodiment, the wiring patterns for connecting the output terminals of the micro-computer to the input terminals of the first pre-driver circuit and the wiring patterns for connecting the output terminals of the micro-computer to the input terminals of the second pre-driver circuit can be formed on the circuit board without intersecting with each other. In a similar manner, the wiring patterns for connecting the output terminals of the first pre-driver circuit to the first current-supply circuit and the wiring patterns for connecting the output terminals of the second pre-driver circuit to the second current-supply circuit can be formed on the circuit board without intersecting with each other. Accordingly, a structure for the wiring patterns on the control board can be simplified and cross-talk can be suppressed.

BRIEF DESCRIPTION OF THE DRAWINGS

The above and other objects, features and advantages of the present invention will become more apparent from the following detailed description made with reference to the accompanying drawings. In the drawings.

DETAILED DESCRIPTION OF THE PREFERRED EMBODIMENTS

The present invention will be explained by way of multiple embodiments with reference to the drawings.

(First Embodiment)

Figure 1:
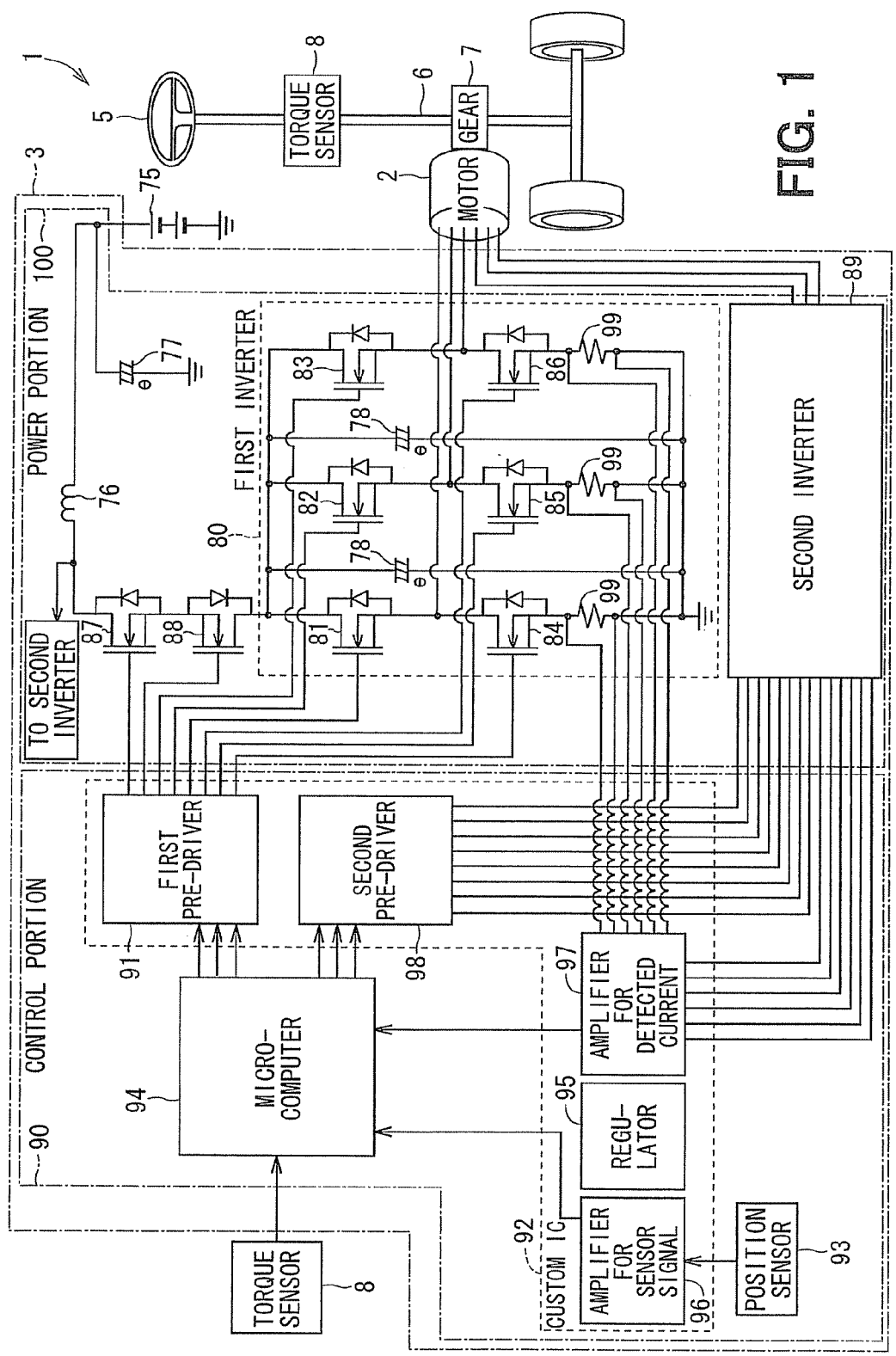
FIG. 1 is a schematic diagram showing a structure of a power steering apparatus for a vehicle according to a first embodiment of the present invention.
Figure 2:
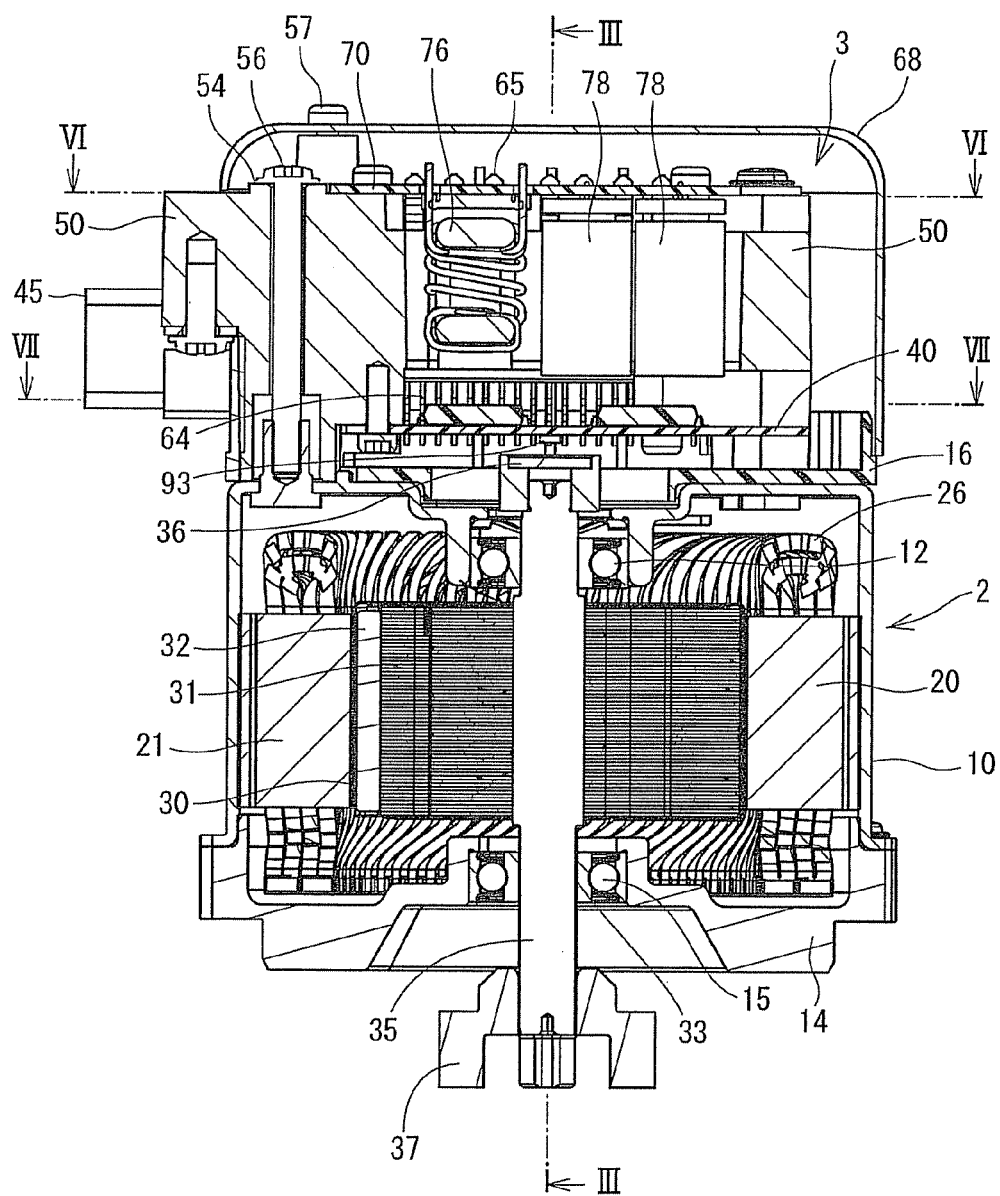
FIG. 2 is a schematic cross sectional view showing a driving apparatus according to the first embodiment of the present invention, taken along a line II-II in FIG. 3.
Figure 3:
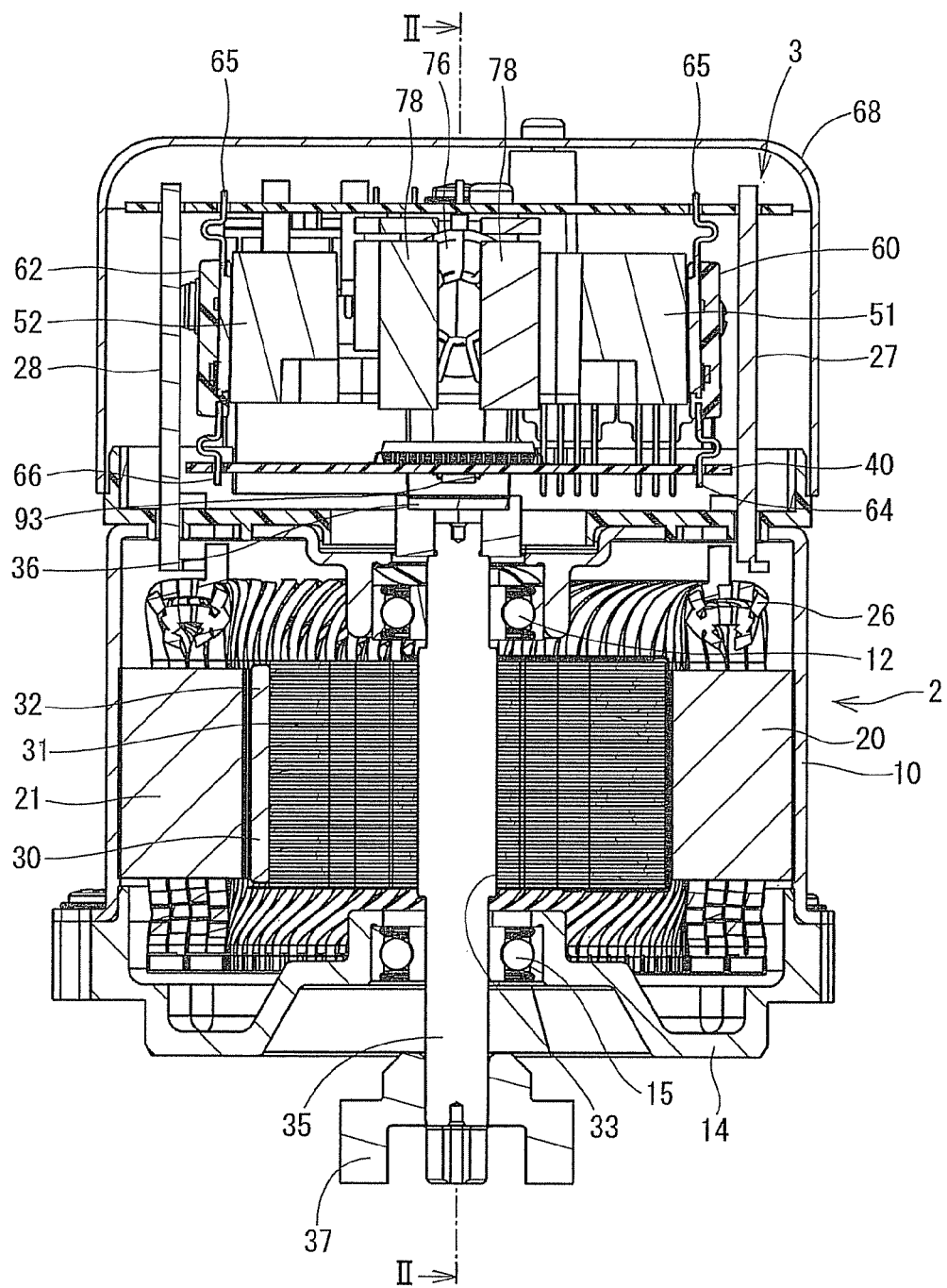
FIG. 3 is a schematic cross sectional view taken along a line III-III FIG. 2.
Figure 4:
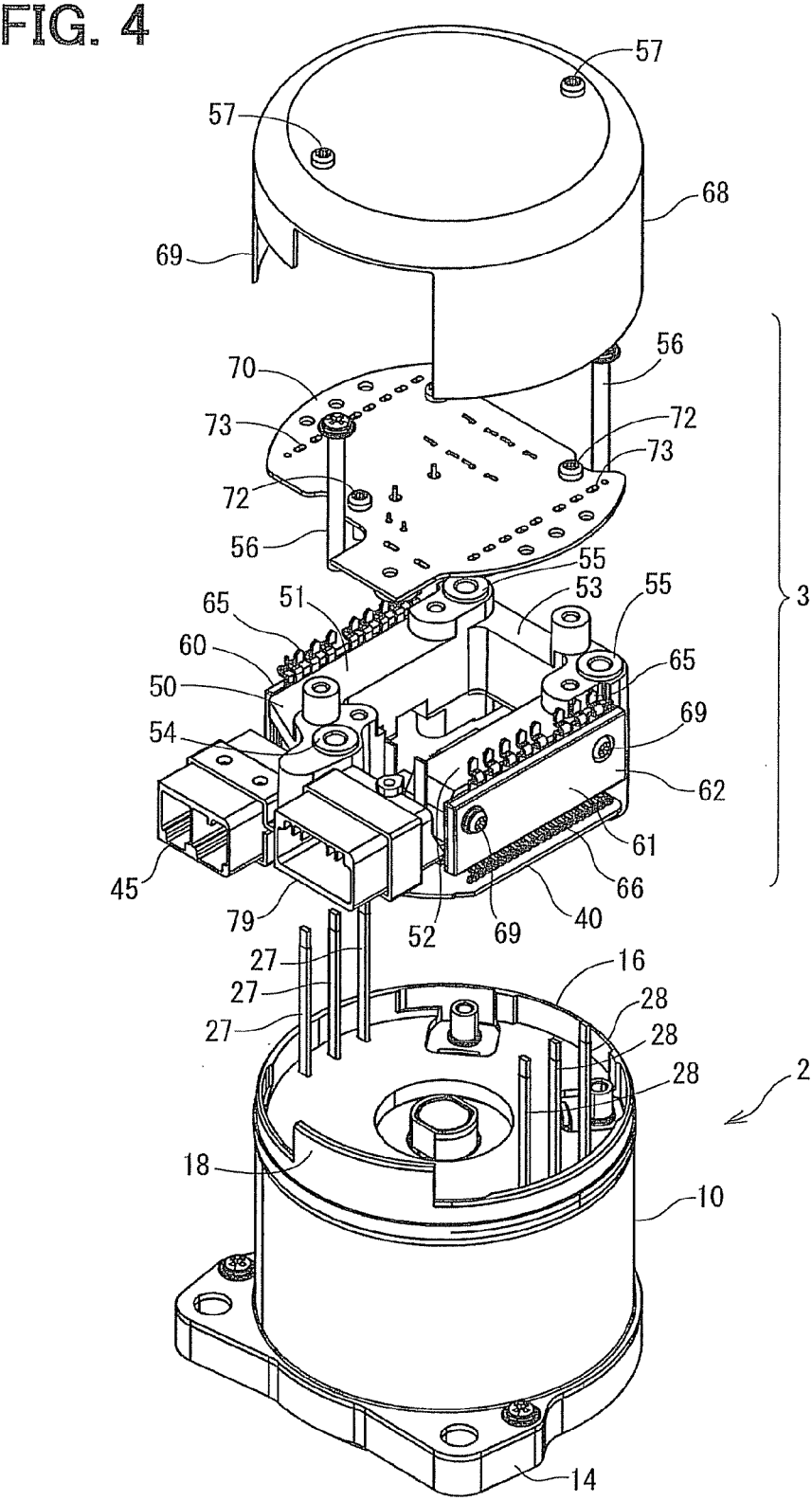
FIG. 4 is an exploded perspective view schematically showing the driving apparatus of the first embodiment.
Figure 5:
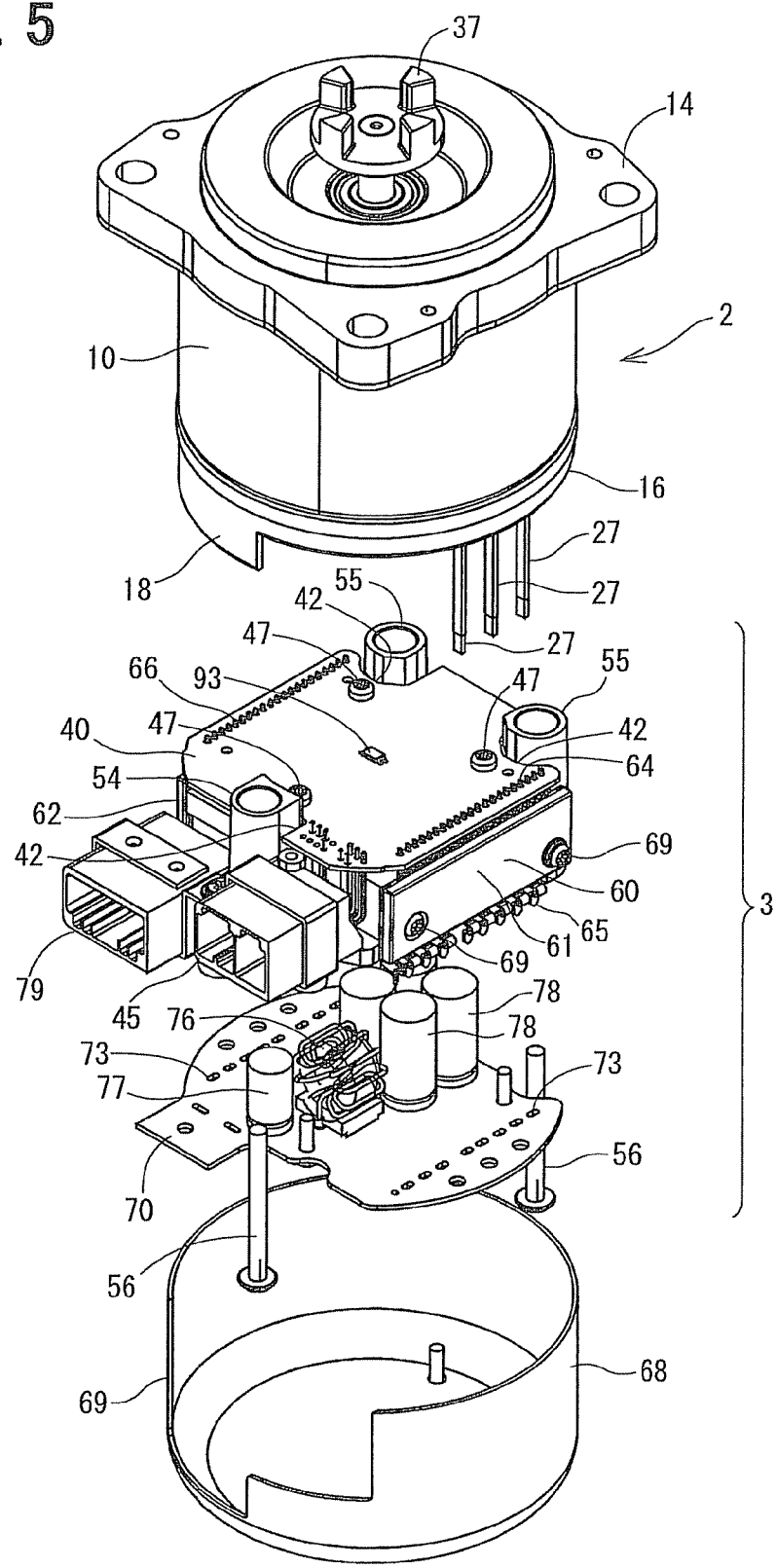
FIG. 5 is also an exploded perspective view, when viewed in an opposite direction, which schematically shows the driving apparatus of the first embodiment.
Figure 6:
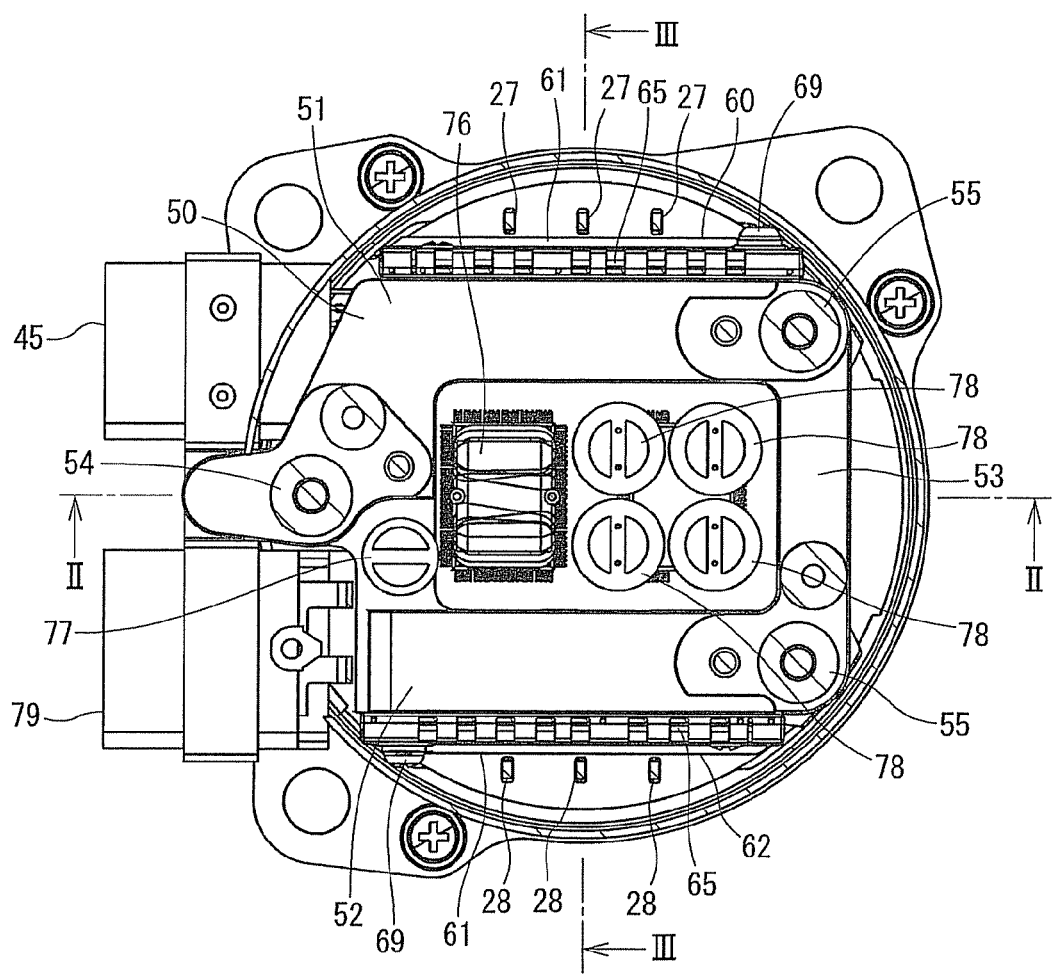
FIG. 6 is a schematic cross sectional view taken along a line VI-VI in FIG. 2.

A driving apparatus 1, to which a controller 3 according to a first embodiment of the present invention is applied, is shown in FIGS. 1 to 8. The controller 3 of the present embodiment drives and controls an operation (rotation) of an electric motor 2 of the driving apparatus 1, which is applied to an electrical power steering device (EPS) for a vehicle. As shown in FIG. 1, the electric motor 2 of the driving apparatus 1 is engaged with a gear of a gear box 7 provided in a column shaft 6. The electric motor 2 of the driving apparatus 1 is rotated in a forward direction or in a backward direction depending on a torque signal outputted from a torque sensor 8 which detects a steering torque of a steering wheel 5 and a vehicle speed signal obtained from CAN (a Controller Area Network: not shown), so as to generate an assisting power for the steering operation.

The driving apparatus 1 is composed of the electric motor 2 and the controller 3. The electric motor 2 is a brushless type motor. Three phase alternating current is supplied from the controller 3 to the electric motor 2 as a driving current thereof, so that the electric motor 2 is rotated in the forward or backward direction.

An electrical structure of the controller 3 will be explained with reference to FIG. 1. The controller 3 is composed of a power portion 100 for supplying large current (the driving current) to the electric motor 2 and a control portion 90 for controlling the operation of the power portion 100.

The power portion 100 has a first smoothing capacitor 77 electrically connected to a power supply line connected to a power source 75, a choke coil 76 connected in series with the power supply line connected between the power source 75 and power-source relays 87 and 88 for attenuating fluctuation of power voltage from the power source 75, a first inverter circuit 80 and a second inverter circuit 89.

The first inverter circuit 80 is also referred to as a first current-supply circuit, while the second inverter circuit 89 is also referred to as a second current-supply circuit.

The first smoothing capacitor 77 and the choke coil 76 form a filter circuit so as to reduce noises transmitted from other electrical devices, to which the electric power is also supplied from the power source 75. In addition, the filter circuit (77 and 76) reduces noises to be transmitted from the first and/or second inverter circuits 80 and 89 to the other electrical devices, to which the electric power is commonly supplied from the power source 75.

The power portion 100 has the power-source relays 87 and 88 for each of the first and second inverter circuits 80 and 89. Each of the power-source relays 87 and 88 is composed of MOSFET (a metal-oxide-semiconductor field-effect transistor; hereinafter simply referred to as a MOS transistor). The power-source relays 87 and 88 provided between the choke coil 76 and MOS transistors 81, 82 and 83 of the first inverter circuit 80 can cut off the driving current flowing from the first inverter circuit 80 to the electric motor 2 in case of a malfunction. In a similar manner, the power-source relays (not shown) provided between the choke coil 76 and MOS transistors (not shown) of the second inverter circuit 89 can cut off the driving current flowing from the second inverter circuit 89 to the electric motor 2 in case of the malfunction.

The first inverter circuit 80 has MOS transistors 81 to 86. A drain of each MOS transistor 81, 82 and 83 of an upper-arm side is connected to the power supply line, while a source thereof is connected to a drain of each corresponding MOS transistor 84, 85 and 86 of a lower-arm side. A source of each MOS transistor 84, 85 and 86 of the lower-arm side is connected to the ground. Wires, which respectively connect the MOS transistors 81, 82 and 83 of the upper-arm side to the MOS transistors 84, 85 and 86 of the lower-arm side, are respectively connected to corresponding U-phase, V-phase and W-phase coils of the electric motor 2. The MOS transistors 81 to 86 are also referred to as switching elements.

The second inverter circuit 89 has the same structure to the above structure of the first inverter circuit 80. An explanation thereof is therefore omitted.

Shunt resistors 99 are electrically connected between each of the MOS transistors 84 to 86 of the lower-arm side and the ground. Electric potential between both ends of each shunt resistor 99 is detected so as to detect the driving current supplied to the respective U-phase, V-phase and W-phase coils.

Each of second smoothing capacitors 78 is connected at its one side to the power supply line for the MOS transistors 81 to 83 of the upper-arm side, while the other side thereof is connected to a ground line for the MOS transistors 84 to 86 of the lower-arm side. In other words, the second smoothing capacitors 78 are connected in parallel to the MOS transistors 81 to 86. The second smoothing capacitors 78 store electric charge so as to assist power supply to the MOS transistors 81 to 86 and absorb ripple current generated by switching operation for the electric current to the electric motor 2.

The control portion 90 has a custom IC 92 as an integrated circuit, a position sensor 93 and a micro-computer 94. The custom IC 92 includes a first pre-driver circuit 91, a second pre-driver circuit 98, a regulator 95, an amplifying portion 96 for a position sensor signal, an amplifying portion 97 for detected voltage and so on.

The regulator 95 is a stabilization circuit for stabilizing the power supply to the respective portions. For example, the micro-computer 94 operates with a stabilized predetermined voltage (for example, 5 volt) from the regulator 95.

A sensor signal from the position sensor 93 is inputted to the amplifying portion 96. The position sensor 93 detects a rotational position of the electric motor 2 and such detected rotational position (a rotational position signal) is supplied to the amplifying portion 96. The rotational position signal is amplified by the amplifying portion 96 and then supplied to the micro-computer 94.

The amplifying portion 97 detects the voltage across the shunt resisters 99 and amplifies the detected voltage to output it to the micro-computer 94.

The rotational position signals of the electric motor 2, the voltage across the shunt resisters 99, the steering torque signal of the torque sensor 8 as well as the information of the vehicle speed and so on are inputted to the micro-computer 94. The micro-computer 94 outputs operation signals to the first and second pre-driver circuits 91 and 98 depending on the rotational position signal when receiving the above signals.

The first pre-driver circuit 91 outputs control signals to the first inverter circuit 80 upon receiving the operation signal from the micro-computer 94. The MOS transistors 81 to 86 of the first inverter circuit 80 are switched on and/or off by the control signals from the first pre-driver circuit 91, so that three phase alternating current to be supplied to the electric motor 2 is generated.

In a similar manner, the second pre-driver circuit 98 outputs control signals to the second inverter circuit 89 upon receiving the operation signals from the micro-computer 94. MOS transistors (not shown) of the second inverter circuit 89 are switched on and/or off by the control signals from the second pre-driver circuit 98, so that three-phase alternating current to be supplied to the electric motor 2 is generated.

The micro-computer 94 controls the first and second inverter circuits 80 and 89 based on the voltage across the shunt resisters 99 from the detected-voltage amplifying portion 97 so as to generate the three-phase alternating current of a substantially sinusoidal waveform, which is supplied to the electric motor 2 as the driving current.

Now, a structure of the driving apparatus 1 will be explained with reference to FIGS. 2 to 7.

The driving apparatus 1 of the present embodiment has the electric motor 2 and the controller 3, which is provided at an axial end of a shaft 35.

The electric motor 2 has a motor casing 10, a stator 20, a rotor 30, the shaft 35 and so on.

The motor casing 10 is formed in a cylindrical shape. An end frame 14 is fixed to an open end of the motor casing 10 by screws and so on, wherein the open end is on an opposite side of the controller 3.

The stator 20 is arranged in a radial inside of the motor casing 10. The stator 20 has twelve projected poles 21 and twelve slots, wherein each of the projected poles 21 is projecting in a radial inward direction of the motor casing 10. The projected poles 21 and the slots are arranged in a circumferential direction of the motor casing 10 at equal intervals. The projected poles 21 are formed by a laminated iron core, which is made of multiple magnetic thin plates. A stator winding 26 is wound on the iron core via an insulator (not shown). The stator winding 26 is composed of two winding systems for the U-phase coil, the V-phase coil and the W-phase coil.

The U-phase coil, the V-phase coil and the W-phase coil of one of the winding systems form a first winding group for generating a rotating magnetic field when the driving current is supplied from the first inverter circuit 80. In a similar manner, the U-phase coil, the V-phase coil and the W-phase coil of the other winding system form a second winding group for generating a rotating magnetic field when the driving current is supplied from the second inverter circuit 89.

Three stator coil terminals 27, which are pulled out from the first winding group toward the controller 3, extend in an axial direction at radially outer sides of a control board 40 and a (first) power module 60 and are connected to a power board 70.

In a similar manner, three stator coil terminals 28, which are pulled out from the second winding group toward the controller 3, extend in an axial direction at radially outer sides of the control board 40 and another (second) power module 62 and at an opposite side to the stator coil terminals 27. The stator coil terminals 28 are likewise connected to the power board 70.

The rotor 30 is movably arranged in an inside of the stator 20, so that the rotor 30 is rotatable relative to the stator 20. The rotor 30 is made of magnetic material (such as, iron) and formed in a cylindrical shape. The rotor 30 has a rotor core 31 and a permanent magnet 32 provided at an outer periphery of the rotor core 31, wherein the magnet 32 is magnetized in such a manner that N-poles and S-poles are alternately arranged in a circumferential direction.

The shaft 35 is fixed to a shaft hole 33 formed at a center of the rotor core 31. The shaft 35 is rotatably supported by a bearing 12 provided at the motor casing 10 and a bearing 15 provided at the end frame 14. Therefore, the shaft 35 is rotatable together with the rotor 30 relative to the stator 20.

A magnet 36 is attached to an axial end of the shaft 35 on a side to the controller 3. The magnet 36 is exposed to the side of the controller 3 so as to face to the control board 40.

The shaft 35 has an output portion 37 at the other axial end thereof on a side opposite to the controller 3. The gear box 7 having therein the gear is provided on a side of the output portion 37 of the shaft 35. The output portion 37 is engaged with the gear of the gear box 7. A rotational force of the shaft 35 is transmitted from the output portion 37 to the gear, so that an operational power is applied to the column shaft 6.

The controller 3 will be explained.

The controller 3 is arranged in a virtual motor casing space, which is formed at the axial side of the motor casing 10 by projecting the motor casing 10 in the axial direction. The controller 3 is composed of two (first and second) power modules 60 and 62, the first smoothing capacitor 77, the second smoothing capacitors 78, the choke coil 76, a heat sink 50, the power board 70, the control board 40 and so on.

The heat sink 50 has a first heat radiating block 51, a second heat radiating block 52 and a coupling portion 53 for coupling the first and second heat radiating blocks to each other. The first and second heat radiating blocks 51 and 52 as well as the coupling portion 53 are made of material having high heat conductivity, such as aluminum, and they are integrally formed. The first and second heat radiating blocks 51 and 52 are opposing to each other at both sides of a virtual plane passing through a center line of the shaft 35.

The heat sink 50 has connecting portions 54 and 55. Through-holes, each of which extends in an axial direction of the electric motor 2, are formed in each of the connecting portions 54 and 55. Bolts 56 are inserted into the through-holes of the connecting portions 54 and 55 and screwed to the motor casing 10.

The power board 70 is made of, for example, a four-layered printed circuit board of glass-epoxy boards, wherein copper wiring patterns are formed. The power board 70 is fixed to the heat sink 50 by screws 72 from a side opposite to the electric motor 2. The first smoothing capacitor 77, the second smoothing capacitors (four capacitors) 78 and the choke coil 76 are arranged in a space formed between the first and second heat radiating blocks 51 and 52 and mounted to the power board 70 on a surface thereof facing toward the electric motor 2.

The first smoothing capacitor 77 and the second smoothing capacitors 78 are made of aluminum electrolytic capacitors. Each of the capacitors 77 and 78 is formed in a cylindrical shape. An outer diameter of the second smoothing capacitors 78 is made to be larger than that of the first smoothing capacitor 77 so that the second smoothing capacitor 78 has a larger electric capacity than the first smoothing capacitor 77.

The first and second smoothing capacitor 77 and 78 are so provided that an axis of the first smoothing capacitor 77 as well as axis of each second smoothing capacitor 78 is in parallel to the axis of the shaft 35 for the electric motor 2.

The choke coil 76 is formed in an annular shape, wherein an axial length thereof is smaller than a radial length (a diameter). The choke coil 76 is so arranged that an axial center line thereof is almost at a right angle to the axis of the electric motor 2. Furthermore, the choke coil 76 is located at a position, which does not overlap a position sensor 93, when viewed in the axial direction of the shaft 35.

A power connector 79 is provided at such a position, that a terminal can be connected to the power connector 79 from a radially outside of the electric motor 2, so that the power connector 79 is connected to the power source 75. As a result, the electric power is supplied to the power board 70 via the power connector 79.

Two first and second power modules 60 and 62 are vertically arranged in parallel to the shaft 35 at outer sides of the heat sink 50 in the radial direction of the electric motor 2.

In each of the power modules 60 and 62, semiconductor chips for the MOS transistor are mounted to copper wiring patterns and resin-molded to form a molded portion 61. Control terminals 64 extend from one side of the molded portion 61, while power terminals 65 extend from the other side of the molded portion 61.

The control signals are inputted to the control terminals 64 for controlling the switching operation of the MOS transistors. The control terminals 64 are respectively connected to a gate of each MOS transistor. The power terminals 65 are respectively connected to the source and drain of each MOS transistor, so that the electric current (the driving current) flows through the power terminals depending on the switching operation thereof.

The first inverter circuit 80 and the power-source relays 87 and 88 are molded in the first power module 60. In a similar manner, the second inverter circuit 89 and power-source relays (not shown) are molded in the second power module 62. Each of the power modules 60 and 62 is arranged at (fixed to) the respective heat radiating blocks 51 and 52.

Each of the power modules 60 and 62 is fixed to the heat sink 50 via heat radiating sheets (not shown) by screws 69. Heat generated at the power modules 60 and 62 are transmitted (radiated) to the heat sink 50 via the heat radiating sheets.

The power terminals 65 of the power modules 60 and 62 are projected from the molded portion 61 toward the power board 70. Each of the power terminals 65 is inserted into respective through-holes 73 formed in the power board 70 and electrically connected to the power board 70 by soldering or the like. Wiring patterns are formed in the power board 70 so as to electrically connect the power terminals 65 to the stator coil terminals 27 and 28, so that driving current is supplied from the power terminals 65 of the power modules 60 and 62 to the first and second winding groups of the electric motor 2 via the power board 70 and the stator coil terminals 27 and 28.

The control terminals 64 and 66 of the power modules 60 and 62 are projected from the molded portion 61 toward the control board 40. Each of the control terminals 64 and 66 is inserted into respective through-holes 43 and 46 formed in the control board 40 and electrically connected to the control board 40 by soldering or the like. The control signals are inputted into the first and second inverter circuits 80 and 89 of the respective power modules 60 and 62 via the control board 40 and the control terminals 64 and 66.

The control terminals 64 of the first power module 60 and the control terminals 66 of the second power module 62 are respectively arranged in straight lines. The through-holes 43 are formed in the control board 40 in a straight line along the straight line of the control terminals 64 of the first power module 60. In a similar manner, the through-holes 46 are formed in the control board 40 in a straight line along the straight line of the control terminals 66 of the second power module 62.

Figure 7:
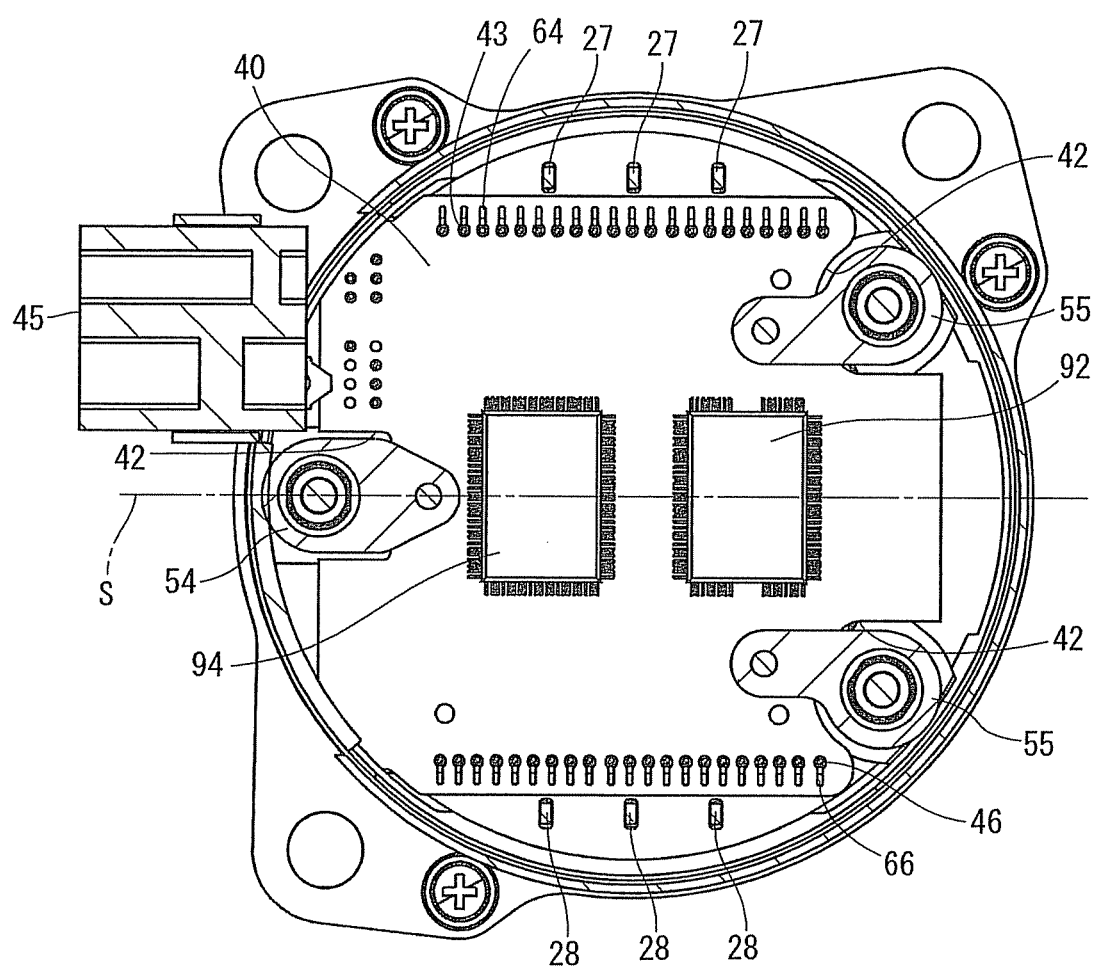
FIG. 7 is a schematic cross sectional view taken along a line VII-VII in FIG. 2.
Figure 8:
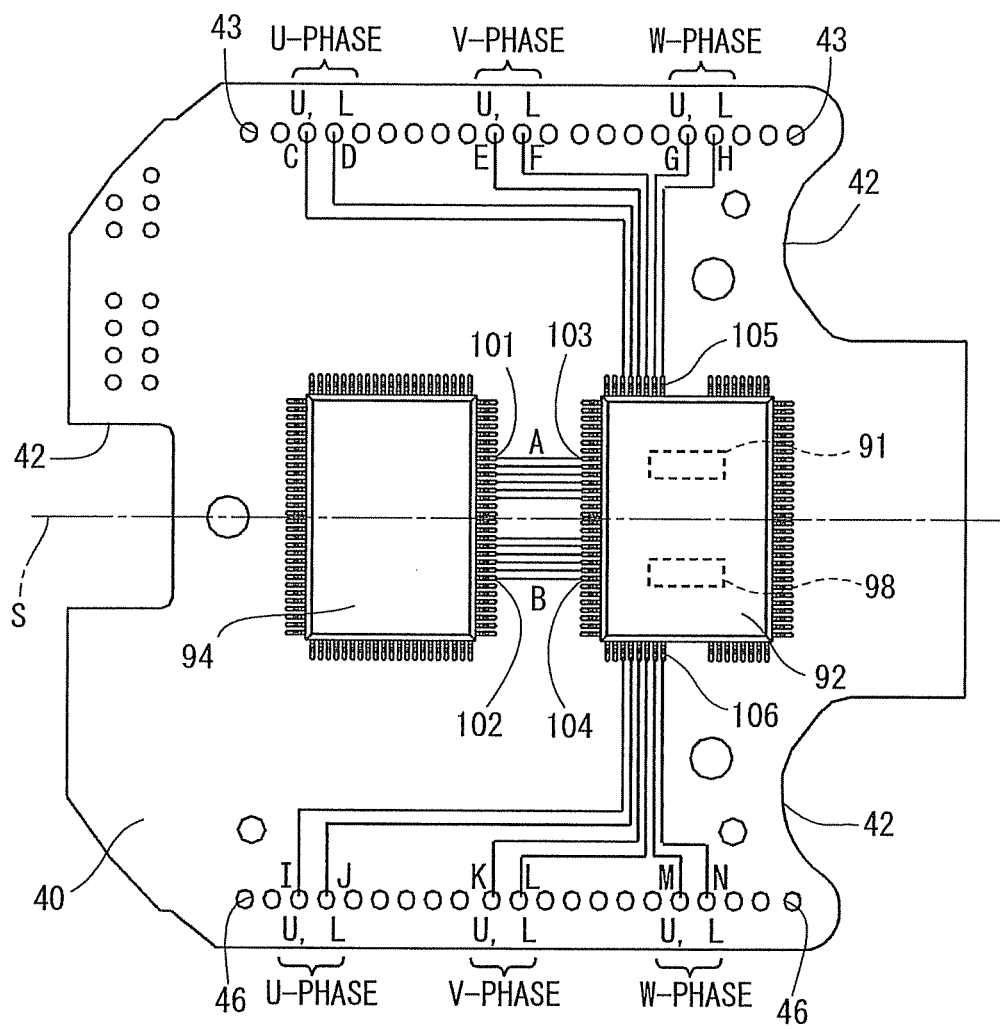
FIG. 8 is a schematic top plan view showing a printed circuit board of an electronic controller of the first embodiment.

As shown in FIGS. 7 and 8, a direction of the straight line for the control terminals 64 of the first power module 60 (that is, a direction of the straight line for the through-holes 43 in the control board 40), an alignment direction for the micro-computer 94 and the custom IC 92, and a direction of the straight line for the control terminals 66 of the second power module 62 (that is, a direction of the straight line for the through-holes 46 in the control board 40) are parallel to each other.

The control board 40 is made of, for example, a four-layered board formed of glass-epoxy boards. The control board 40 is formed in an almost rectangular shape, so that the control board 40 is accommodated in an area of the motor casing. Three notched portions 42 are formed in the control board 40 as escapes for the purpose of assembling the heat sink 50 to the motor casing 10. The control board 40 is fixed to the heat sink 50 by screws 47 from a side of the electric motor 2.

Various kinds of electric and/or electronic parts for the control portion 90 are mounted on the control board 40. The position sensor 93 is mounted to the surface of the control board 40 on the side of the electric motor 2. The position sensor 93 is provided on an axial line of the shaft 35 and opposed to the magnet 36. The position sensor 93 detects a change of magnetic field generated by the magnet 36, which is rotated together with the shaft 35, so that a position of the rotor 30 is detected.

A control connector 45 is provided at one of short sides of the control board 40. The control connector 45 is provided in the same direction to the power connector 79. The control connector 45 is provided in such a manner that a terminal can be connected to the control connector 45 from the radially outside of the electric motor 2, so that various kinds of sensor information are inputted.

The micro-computer 94 and the custom IC 92 are mounted to the surface of the control board 40 on the opposite side to the electric motor 2.

The micro-computer 94 is mounted to the control board 40 on a center line S, a distance of which from the first power module 60 and a distance of which from the second power module 62 are the same to each other.

The micro-computer 94 is mounted to the control board 40 at such a position, which corresponds to an intermediate position between the through-holes 43 for the control terminals 64 of the first power module 60 and the through-holes 46 for the control terminals 66 of the second power module 62. In other words, when the center line S is supposed on the control board 40, wherein the distance between the center line S and the first power module 60 and the distance between the center line S and the second power module 62 are identical to each other, the micro-computer 94 is mounted to the control board 40 on the center line S.

The custom IC 92 is also mounted to the control board 40 on the center line S. The custom IC 92 (as a functional block) has the first pre-driver circuit 91, the second pre-driver circuit 98, the regulator 95, the amplifying portion 96 for the position sensor signal, the amplifying portion 97 for the detected voltage and so on.

Output terminals 101 of the micro-computer 94 for outputting the operation signals to the first pre-driver circuit 91 of the custom IC 92 are arranged on a side closer to the first power module 60 with respect to the center line S. Output terminals 102 for outputting the operation signals to the second pre-driver circuit 98 are arranged on a side closer to the second power module 62 with respect to the centerline S. The output terminals 101 and the output terminals 102 are symmetric with respect to the center line S.

Input terminals 103 of the custom IC 92 for inputting the operation signals from the micro-computer 94 into the first pre-driver circuit 91 are arranged on the side closer to the first power module 60 with respect to the center line S. Input terminals 104 for inputting the operation signals from the micro-computer 94 into the second pre-driver circuit 98 are arranged on the side closer to the second power module 62 with respect to the center line S. The input terminals 103 and the input terminals 104 are symmetric with respect to the center line S.

Output terminals 105 of the custom IC 92 for outputting the control signals from the first pre-driver circuit 91 to the first power module 60 are arranged on the side closer to the first power module 60 with respect to the center line S. Output terminals 106 for outputting the control signals from the second pre-driver circuit 98 to the second power module 62 are arranged on the side closer to the second power module 62 with respect to the center line S. The output terminals 105 and the output terminals 106 are symmetric with respect to the center line S.

The operation signals are respectively outputted from the output terminals 101 and 102 of the micro-computer 94 to the input terminal 103 of the first pre-driver circuit 91 and the input terminal 104 of the second pre-driver circuit 98 via printed wiring patterns A and B formed on the control board 40. The wiring patterns A and B are symmetric with respect to the center line S.

The first pre-driver circuit 91 and the second pre-driver circuit 98 are respectively arranged in the custom IC 92, in such a manner that those pre-driver circuits 91 and 98 are symmetric with respect to the center line S. However, the location of the first and second pre-driver circuits 91 and 98 is not limited to the above arrangement. This is because length of wiring patterns in the custom IC 92 is smaller than length of wiring patterns on the control board 40 and thereby an influence for making equivalent impedance is small.

The first pre-driver circuit 91 outputs the control signals from the output terminals 105 of the custom IC 92 to the first inverter circuit 80 molded in the first power module 60 via wiring patterns C to H, when receiving the operation signals from the micro-computer 94. More exactly, the wiring pattern C transmits the control signal to the MOS transistor 81 on the upper-arm side for the U-phase coil. The wiring pattern D transmits the control signal to the MOS transistor 84 on the lower-arm side for the U-phase coil. The wiring pattern E transmits the control signal to the MOS transistor 82 on the upper-arm side for the V-phase coil. The wiring pattern F transmits the control signal to the MOS transistor 85 on the lower-arm side for the V-phase coil. The wiring pattern G transmits the control signal to the MOS transistor 83 on the upper-arm side for the W-phase coil. The wiring pattern H transmits the control signal to the MOS transistor 86 on the lower-arm side for the W-phase coil.

The wiring patterns C to H form three pairs of the wiring patterns (C & D, E & F, G & H) corresponding to the respective phase coils (the U-phase, V-phase and W-phase coils). Each pair of the wiring patterns is formed in an almost Z-letter shape having a first straight portion, a second straight portion and a third straight portion, as explained below.

The first straight portion of each pair of the wiring patterns C to H straightly extends from the output terminals 105 of the custom IC 92 toward the first power module 60 in a direction perpendicular to the alignment line of the micro-computer 94 and the custom IC 92. The second straight portion of each pair of the wiring patterns C to H is bent at a right angle and extends in a direction in parallel to the direction of the through-holes 43 on a side closer to the first power module 60. More exactly, the second straight portion of the pair of the wiring patterns C and D as well as the second straight portion of the other pair of the wiring patterns E and F is bent in a direction to a side of the micro-computer 94, while the second straight portion of the remaining pair of the wiring patterns G and H is bent in a direction to a side of the custom IC 92. Each of the second straight portions of the respective pairs of the wiring patterns extends to such a position corresponding to the respective through-holes 43. Then, the third straight portion of the respective pairs of the wiring patterns C to H is again bent in a direction parallel to that of the first straight portion toward the respective through-holes 43, at which each of the wiring patterns C to H is electrically connected to the respective control terminals 64 extending into each of the through-holes 43. According to the above structure, the three-phase alternating current of the driving current is supplied from the first inverter circuit 80 to the first winding group of the electric motor 2 via the power board 70 and the stator coil terminals 27.

The second pre-driver circuit 98 likewise outputs the control signals from the output terminals 106 of the custom IC 92 to the second inverter circuit 89 molded in the second power module 62 via wiring patterns I to N, when receiving the operation signals from the micro-computer 94. More exactly, the wiring pattern I transmits the control signal to the MOS transistor (not shown) on the upper-arm side for the U-phase coil. The wiring pattern J transmits the control signal to the MOS transistor (not shown) on the lower-arm side for the U-phase coil. The wiring pattern K transmits the control signal to the MOS transistor (not shown) on the upper-arm side for the V-phase coil. The wiring pattern L transmits the control signal to the MOS transistor (not shown) on the lower-arm side for the V-phase coil. The wiring pattern M transmits the control signal to the MOS transistor (not shown) on the upper-arm side for the W-phase coil. The wiring pattern N transmits the control signal to the MOS transistor (not shown) on the lower-arm side for the W-phase coil.

In a similar manner to the wiring patterns C to H, the wiring patterns I to N form three pairs of the wiring patterns (I & J, K & L, M & N) corresponding to the respective phase coils (the U-phase, V-phase and W-phase coils). Each pair of the wiring patterns is formed in an almost Z-letter shape having a first straight portion, a second straight portion and a third straight portion, as explained below.

The first straight portion of each pair of the wiring patterns I to N straightly extends from the output terminals 106 of the custom IC 92 toward the second power module 62 in a direction perpendicular to the alignment line of the micro-computer 94 and the custom IC 92. The second straight portion of each pair of the wiring patterns I to N is bent at a right angle and extends in a direction in parallel to the direction of the through-holes 46 on a side closer to the second power module 62. More exactly, the second straight portion of the pair of the wiring patterns I and J as well as the second straight portion of the other pair of the wiring patterns K and L is bent in the direction to the side of the micro-computer 94, while the second straight portion of the remaining pair of the wiring patterns M and N is bent in the direction to the side of the custom IC 92. Each of the second straight portions of the respective pairs of the wiring patterns extends to such a position corresponding to the respective through-holes 46. Then, the third straight portion of the respective pairs of the wiring patterns I to N is again bent in a direction parallel to that of the first straight portion toward the respective through-holes 46, at which each of the wiring patterns I to J is electrically connected to the respective control terminals 66 extending into each of the through-holes 46. According to the above structure, the three-phase alternating current of the driving current is supplied from the second inverter circuit 89 to the second winding group of the electric motor 2 via the power board 70 and the stator coil terminals 28.

The wiring patterns C to H and the wiring patterns I to N are symmetric with respect to the center line S. Accordingly, the impedance of the wiring patterns C to H is almost equivalent to the impedance of the wiring patterns I to N. Therefore, the gate input signals for the MOS transistors 81 to 86 of the first inverter circuit 80 are almost equal to that for the MOS transistors of the second inverter circuit 89. This means that the driving current to be supplied to the first winding group of the electric motor 2 is almost equal to that to the second winding group thereof.

However, the wiring patterns C to H and the wiring patterns I to N should not be limited to the above explained arrangement. The terminal positions for the U-phase, V-phase and W-phase for the inverter circuits should not be symmetric with respect to the center line S. This is because the impedance for the first power module can be made almost equal to the impedance for the second power module by modifying the wiring patterns.

The controller 3 is accommodated in a cover 68. The cover 68 is made of magnetic material, such as iron, for preventing electric voltage leaking from the controller 3 to its outside and also preventing dust from going into the inside thereof. The cover 68 is fixed to the motor casing 10 by bolts 57 together with the heat sink 50. An opening 69 is formed in the cover at positions corresponding to the control connector 45 and the power connector 79. The control connector 45 and power connector 79 outwardly extend from the opening 69 in the radial direction. A resin guide member 16 is provided between the motor casing 10 and the cover 68. A projecting wall 18 is formed in the resin guide member 16 at such a position corresponding to the opening 69 on a side to the power connector 79.

An operation of the driving apparatus 1 will be explained.

The micro-computer 94 generates pulse signals (the operation signals), which are produced by PWM control and based on the signals from the position sensor 93, the torque sensor 8, the shunt resistors 99 and so on, via the pre-driver circuits 91 and 98, so that the steering operation of the steering wheel 5 is assisted depending on the vehicle speed.

The pulse signals are inputted to the inverter circuits 80 and 89 of the two systems, which are respectively provided in the first and second power modules 60 and 62, so as to control the operations of switch-on and switch-off of the MOS transistors. As a result, the driving current of the sinusoidal wave of different phase is supplied to each of the coils of the first and second winding groups of the stator winding 26, so that the rotating magnetic field is generated. The rotor 30 and the shaft 35 are rotated by the rotating magnetic field. Then, the driving force is outputted from the output portion 37 to the gear box 7 of the column shaft 6 so as to assist the steering operation of the steering wheel 5 by the vehicle driver.

The controller 3 of the driving apparatus 1 of the present embodiment has the following advantages.

According to the present embodiment, the micro-computer 94 and the custom IC 92 are mounted to the control board 40 on the center line S. In the micro-computer 94, the output terminals 101 for outputting the operation signals to the first pre-driver circuit 91 and the output terminals 102 for outputting the operation signals to the second pre-driver circuit 98 are arranged to be symmetric with respect to the center line S. In the custom IC 92, the input terminals 103, through which the operation signals from the micro-computer 94 are inputted into the first pre-driver circuit 91, and the input terminals 104, through which the operation signals from the micro-computer 94 are inputted into the second pre-driver circuit 98, are likewise arranged to be symmetric with respect to the center line S. Furthermore, the output terminals 105 for outputting the control signals from the first pre-driver circuit 91 to the first inverter circuit 80 and the output terminals 106 for outputting the control signals from the second pre-driver circuit 98 to the second inverter circuit 89 are likewise arranged to be symmetric with respect to the center line S.

According to the above structure, a length of the wiring patterns A between the micro-computer 94 and the custom IC 92 can be easily made equal to a length of the wiring patterns B between the micro-computer 94 and the custom IC 92. In other words, the impedance from the micro-computer 94 to the first pre-driver circuit 91 and the impedance from the micro-computer 94 to the second pre-driver circuit 98 can be easily made equivalent to each other. In addition, a length of the wiring patterns C to H between the first pre-driver circuit 91 and the first inverter circuit 80 can be easily made equal to a length of the wiring patterns I to N between the second pre-driver circuit 98 and the second inverter circuit 89. In other words, the impedance between the first pre-driver circuit 91 and the first inverter circuit 80 and the impedance between the second pre-driver circuit 98 and the second inverter circuit 89 can be easily made equivalent to each other. As above, the impedance from the micro-computer 94 to the first inverter circuit 80 and the impedance from the micro-computer 94 to the second inverter circuit 89 can be easily made equivalent to each other. As a result, the driving current to be supplied to the first winding group of the electric motor 2 from the first inverter circuit 80 can be easily made equal to the driving current to be supplied to the second winding group of the electric motor 2 from the second inverter circuit 89. Therefore, the rotational balance of the electric motor 2 can be improved.

According to the present embodiment, the wiring patterns A for connecting the micro-computer 94 to the first pre-driver circuit 91 and the wiring patterns B for connecting the micro-computer 94 to the second pre-driver circuit 98 can be formed on the circuit board 40 without intersecting with each other. In a similar manner, the wiring patterns C to H for connecting the first pre-driver circuit 91 to the first inverter circuit 80 and the wiring patterns I to N for connecting the second pre-driver circuit 98 to the second inverter circuit 89 can be formed on the circuit board 40 without intersecting with each other. Accordingly, a structure for the wiring patterns on the control board 40 can be simplified and cross-talk can be suppressed.

According to the present embodiment, the wiring patterns A for connecting the micro-computer 94 to the first pre-driver circuit 91 and the wiring patterns B for connecting the micro-computer 94 to the second pre-driver circuit 98 are provided on the control board 40 so as to be symmetric with respect to the center line S. In a similar manner, the wiring patterns C to H for connecting the first pre-driver circuit 91 to the first inverter circuit 80 and the wiring patterns I to N for connecting the second pre-driver circuit 98 to the second inverter circuit 89 are provided on the control board 40 so as to be symmetric with respect to the center line S. According to such a structure, the impedance of the wiring patterns A and C to H from the micro-computer 94 to the first inverter circuit 80 and the impedance of the wiring patterns B and I to N from the micro-computer 94 to the second inverter circuit 89 can be easily made equivalent to each other.

(Second Embodiment)

Figure 9:
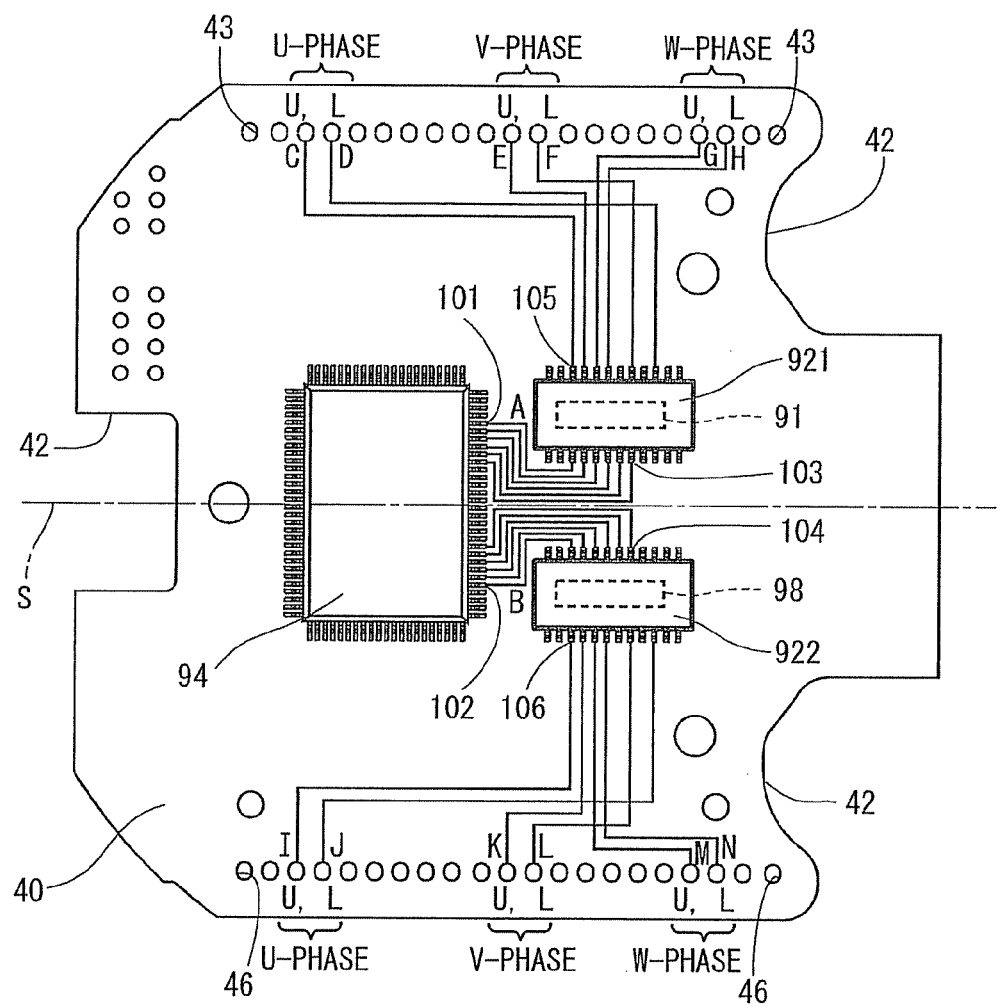
FIG. 9 is a schematic top plan view showing a printed circuit board of an electronic controller of a second embodiment of the present invention.

FIG. 9 shows the control board 40 for the controller according to a second embodiment of the present invention. The same reference numerals are used in the second embodiment for the purpose of designating the same or similar part or portion to the first embodiment, to thereby omit repeated explanation as much as possible. According to the present embodiment, the custom IC is composed of a first custom IC 921 and a second custom IC 922. The first custom IC 921 has the first pre-driver circuit 91, while the second custom IC 922 has the second pre-driver circuit 98. The first and second custom ICs 921 and 922 are arranged on the control board 40 so as to be symmetric with respect to the center line S.

The input terminals 103, through which the operation signals are inputted from the micro-computer 94 into the first pre-driver circuit 91, are provided in the first custom IC 921 on a side to the second custom IC 922. The output terminals 105 for outputting the control signals from the first pre-driver circuit 91 to the first inverter circuit 80 of the first power module 60 are provided in the first custom IC 921 on a side to the first power module 60.

In a similar manner, the input terminals 104, through which the operation signals are inputted from the micro-computer 94 into the second pre-driver circuit 98, are provided in the second custom IC 922 on a side to the first custom IC 921. The output terminals 106 for outputting the control signals from the second pre-driver circuit 98 to the second inverter circuit 89 of the second power module 62 are provided in the second custom IC 922 on a side to the second power module 62.

The operation signals are outputted from the output terminals 101 of the micro-computer 94 to the input terminals 103 of the first pre-driver circuit 91 formed in the first custom IC 921 via the wiring patterns A formed on the control board 40. In a similar manner, the operation signals are outputted from the output terminals 102 of the micro-computer 94 to the input terminals 104 of the second pre-driver circuit 98 formed in the second custom IC 922 via the wiring patterns B formed on the control board 40.

Each of the wiring patterns A is composed of four straight portions, which are continuously connected one after the other and formed in an almost Z shape. A first straight portion extends from the output terminal 101 in the alignment direction of the micro-computer 94 and the first custom IC 921. A second straight portion is bent at a position between the micro-computer 94 and the custom IC 921 toward the center line S, that is, in a direction perpendicular to the alignment direction. A third straight portion is bent at a position short of the center line S and extends in the alignment direction by a predetermined distance. A fourth straight portion is bent in a direction perpendicular to the alignment direction toward the corresponding input terminal 103, at which the wiring pattern A is connected to the input terminal 103.

In a similar manner, each of the wiring patterns B is composed of four straight portions, which are continuously connected one after the other and formed in an almost Z shape. A first straight portion extends from the output terminal 102 in the alignment direction of the micro-computer 94 and the second custom IC 922. A second straight portion is bent at a position between the micro-computer 94 and the custom IC 922 toward the center line S, that is, in a direction perpendicular to the alignment direction. A third straight portion is bent at a position short of the center line S and extends in the alignment direction by a predetermined distance. A fourth straight portion is bent in a direction perpendicular to the alignment direction toward the corresponding input terminal 104, at which the wiring pattern B is connected to the input terminal 104.

The first pre-driver circuit 91 outputs the control signals from the output terminals 105 of the first custom IC 921 to the first inverter circuit 80 molded in the first power module 60 via the wiring patterns C to H, when receiving the operation signals from the micro-computer 94.

In a similar manner to the first embodiment, the wiring patterns C to H form three pairs of the wiring patterns (C & D, E & F, G & H) corresponding to the respective phase coils (the U-phase, V-phase and W-phase coils). Each pair of the wiring patterns is formed in an almost Z-letter shape having a first to a third straight portion, which are continuously connected one after the other, as explained below. The first straight portion of each pair of the wiring patterns C to H extends from the output terminals 105 of the first custom IC 921 toward the first power module 60 in the direction perpendicular to the alignment line of the micro-computer 94 and the first custom IC 921. The second straight portion is bent at a right angle and extends in a direction in parallel to the direction of the through-holes 43 on a side closer to the first power module 60. More exactly, the second straight portion of the pair of the wiring patterns C and D as well as the second straight portion of the other pair of the wiring patterns E and F is bent in a direction to a side of the micro-computer 94, while the second straight portion of the remaining pair of the wiring patterns G and H is bent in a direction to a side of the first custom IC 921. Each of the second straight portions of the respective pairs of the wiring patterns extends to such a position corresponding to the respective through-holes 43. Then, the third straight portion of the respective pairs of the wiring patterns C to H is again bent in a direction parallel to that of the first straight portion toward the respective through-holes 43, at which each of the wiring patterns C to H is electrically connected to the respective control terminals 64 extending into each of the through-holes 43.

According to the above structure, the three-phase alternating current of the driving current is supplied from the first inverter circuit 80 to the first winding group of the electric motor 2 via the power terminals 65, the power board 70 and the stator coil terminals 27.

The second pre-driver circuit 98 likewise outputs the control signals from the output terminals 106 of the second custom IC 922 to the second inverter circuit 89 molded in the second power module 62 via the wiring patterns I to N, when receiving the operation signals from the micro-computer 94.

In a similar manner to the above wiring patterns C to H, the wiring patterns I to N form three pairs of the wiring patterns (I & J, K & L, M & N) corresponding to the respective phase coils (the U-phase, V-phase and W-phase coils). Each pair of the wiring patterns is formed in an almost Z-letter shape having a first to a third straight portion, which are continuously connected one after the other, as explained below. The first straight portion of each pair of the wiring patterns I to N extends from the output terminals 106 of the second custom IC 922 toward the second power module 62 in the direction perpendicular to the alignment line of the micro-computer 94 and the second custom IC 922. The second straight portion is bent at a right angle and extends in a direction in parallel to the direction of the through-holes 46 on a side closer to the second power module 62. More exactly, the second straight portion of the pair of the wiring patterns I and J as well as the second straight portion of the other pair of the wiring patterns K and L is bent in a direction to the side of the micro-computer 94, while the second straight portion of the remaining pair of the wiring patterns M and N is bent in a direction to a side of the second custom IC 922. Each of the second straight portions of the respective pairs of the wiring patterns extends to such a position corresponding to the respective through-holes 46. Then, the third straight portion of the respective pairs of the wiring patterns I to N is again bent in a direction parallel to that of the first straight portion toward the respective through-holes 46, at which each of the wiring patterns I to N is electrically connected to the respective control terminals 66 extending into each of the through-holes 46.

According to the above structure, the three-phase alternating current of the driving current is supplied from the second inverter circuit 89 to the second winding group of the electric motor 2 via the power terminals 65, the power board 70 and the stator coil terminals 28.

However, the wiring patterns C to H and the wiring patterns I to N should not be limited to the above explained arrangement. The terminal positions for the U-phase, V-phase and W-phase for the inverter circuits should not be symmetric with respect to the center line S. This is because the impedance for the first power module can be made almost equal to the impedance for the second power module by modifying the wiring patterns.

According to the present embodiment, the first and second pre-driver circuits 91 and 98 are provided in the respective custom ICs 921 and 922. Even according to such a structure, the impedance of the wiring patterns A and C to H from the micro-computer 94 to the first inverter circuit 80 and the impedance of the wiring patterns B and I to N from the micro-computer 94 to the second inverter circuit 89 can be easily made equivalent to each other.

(Further Modifications)

According to the above embodiments, the controller 3 is provided at the axial end of the electric motor 2, which is an opposite side to the gear box 7. The controller 3 may be provided at an axial end of the electric motor 2 but between the electric motor 2 and the gear box 7. In such a modification, the shaft for the electric motor extends toward the gear box passing though a space surrounded by the first and second heat radiating blocks 51 and 52, the control board 40 and the power board 70.

According to the above embodiments, the electric motor 2 is operated by the two systems of the inverter circuits. However, the electric motor may be operated by more than two systems of the inverter circuits.

Furthermore, instead of the three-phase inverter circuits, the electric motor may by operated by an H-bridge circuit (as a power supply circuit). In such a modification, the electric motor is a brush-type motor.

According to the above embodiments, all of the MOS transistors are resin-molded in the power modules. However, a part of the MOS transistors may be resin-molded. A number of power modules may be more than two.

According to the above embodiments, the MOS transistors are used as switching elements. However, any other types of the switching elements may be used.

Furthermore, according to the above embodiments, the heat sink is composed of two heat radiating blocks which are coupled to each other. However, the heat radiating blocks may be separately formed.

The above driving apparatus is applied to the EPS. The driving apparatus of the present invention may be applied to other fields.

As above, the present invention should not be limited to the above embodiments, but may be modified in various ways without departing a spirit of the invention.

What is claimed is:

1. A controller for driving and controlling rotation of an electric motor comprising:
   a first current-supply circuit for supplying driving current to the electric motor via a first power line;
   a second current-supply circuit for supplying driving current to the electric motor via a second power supply line the electric motor being independently operated from the first current-supply circuit;
   a control board to which control terminals are connected, wherein control signals for controlling switching operations of switching elements included in the first and second current-supply circuits are inputted to the control terminals;
   an integrated circuit mounted to the control board and having a first pre-driver circuit for outputting the control signals to only the first current-supply circuit and a second pre-driver circuit for outputting the control signals to only the second current-supply circuit; and
   a micro-computer mounted to the control board on a center line of the control board for outputting operation signals for controlling outputs of the control signals of the first and second pre-driver circuits, wherein a distance between the center line and the first current-supply circuit and a distance between the center line and the second current-supply circuit is substantially equal to each other,
   wherein output terminals of the micro-computer for outputting the operation signals to the first pre-driver circuit and output terminals of the micro-computer for outputting the operation signals to the second pre-driver circuit are arranged so as to be symmetric with respect to the center line,
   wherein the integrated circuit has first and second input terminals, which are mounted to the control board so as to be symmetric with respect to the center line, wherein the operation signals are respectively transmitted from the micro-computer to the first and second input terminals via wiring patterns formed on the control board and then inputted into the first and second pre-driver circuits,
   wherein the integrated circuit has first and second output terminals, which are mounted to the control board so as to be symmetric with respect to the center line, wherein the control signals are respectively outputted from the first and second pre-driver circuits to the first and second current-supply circuits via wiring patterns formed on the control board; and
   wherein, due to the symmetric nature of the output terminals of the micro-computer, the symmetric nature of the first and second input terminals of the integrated circuit and the symmetric nature of the first and second output terminals of the integrated circuit, an impedance from the micro-computer to the first current-supply circuit and an impedance from the micro-computer to the second current-supply circuit are equivalent.

2. The controller according to the claim 1, wherein
   the wiring patterns for connecting the micro-computer to the first pre-driver circuit and the wiring patterns for connecting the micro-computer to the second pre-driver circuit are formed on the control board so as to be symmetric with respect to the center line, and
   the wiring patterns for connecting the first pre-driver circuit to the first current-supply circuit and the wiring patterns for connecting the second pre-driver circuit to the second current-supply circuit are formed on the control board so as to be symmetric with respect to the center line.

3. The controller according to the claim 1, wherein the integrated circuit includes the first and second pre-driver circuits and is mounted to the control board on the center line.

4. The controller according to the claim 1, wherein
the integrated circuit is composed of a first integrated circuit having the first pre-driver circuit and a second integrated circuit having the second pre-driver circuit, and
the first and the second integrated circuits are mounted to the control board so as to be symmetric with respect to the center line.

5. The controller according to the claim 1, further comprising:
a heat sink having a first and a second heat radiating block, wherein a first power module including the first current-supply circuit is attached to the first heat radiating block and a second power module including the second current-supply circuit is attached to the second heat radiating block, and
the control board is fixed to the heat sink in such a way that the control board overstrides the first and second heat radiating blocks.

6. The controller according to the claim 1, wherein
the electric motor has a first winding group for generating a rotating magnetic field when the driving current is supplied from the first current-supply circuit to the electric motor, and
the electric motor has a second winding group for generating a rotating magnetic field when the driving current is supplied from the second current-supply circuit to the electric motor.

7. The controller according to the claim 1, wherein
the first current-supply unit operates independent from the second current-supply unit and the second current-supply unit operates independent form the first current-supply unit.

8. The controller according to the claim 1, wherein
the wiring patterns for connecting the micro-computer to the first pre-driver circuit and the wiring patterns for connecting the micro-computer to the second pre-driver circuit are equal in length, and
the wiring patterns for connecting the first pre-driver circuit to the first current-supply circuit and the wiring patterns for connecting the second pre-driver circuit to the second current-supply circuit are equal in length.

9. The controller according to the claim 1, wherein
the wiring patterns connecting the micro-computer to the first pre-driver circuit and the wiring patterns connecting the micro-computer to the second pre-driver circuit are not electrically connected to each other directly.

10. The controller according to the claim 1, wherein
the wiring patterns connecting the first pre-driver circuit to the first current-supply and the wiring patterns connecting the second pre-driver circuit to the second current-supply circuit are not electrically connected to each other directly.

11. The controller according to the claim 9, wherein
the wiring patterns connecting the first pre-driver circuit to the first current-supply and the wiring patterns connecting the second pre-driver circuit to the second current-supply circuit are not electrically connected to each other directly.

* * * * *